Figure 1:
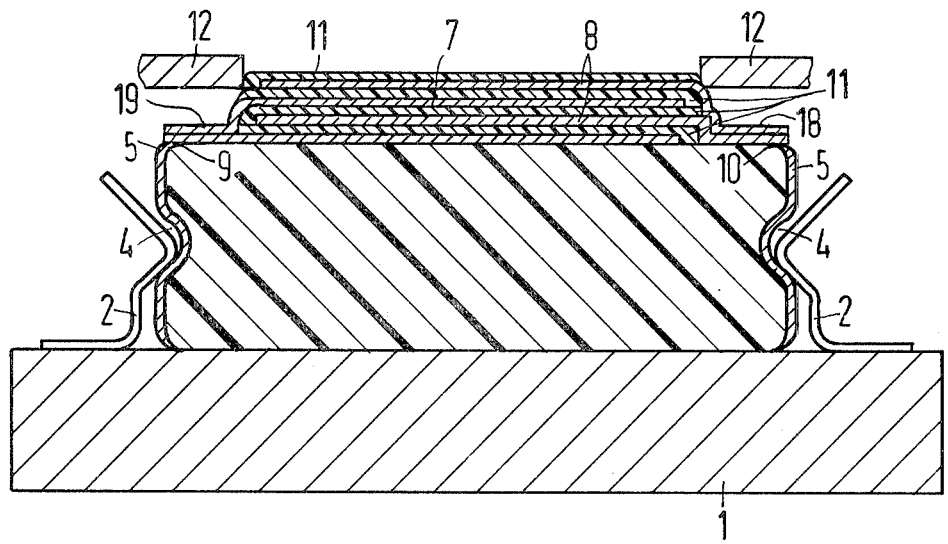

United States Patent [19]

Behn

[11] 4,387,113
[45] Jun. 7, 1983

[54] METHOD OF PRODUCING ELECTRICAL LAYER CAPACITORS WITH GLOW-POLYMERIZATE LAYERS AS DIELECTRICS

[75] Inventor: Reinhard Behn, Munich, Fed. Rep. of Germany

[73] Assignee: Siemens Aktiengesellschaft, Berlin and Munich, Fed. Rep. of Germany

[21] Appl. No.: 353,880

[22] Filed: Mar. 2, 1982

[30] Foreign Application Priority Data

Mar. 17, 1981 [DE] Fed. Rep. of Germany ....... 3110351

[51] Int. Cl.³ .......................... B05D 5/12; H01G 4/00
[52] U.S. Cl. ......................................... 427/40; 427/41
[58] Field of Search .................................... 427/40, 41

[56] References Cited

FOREIGN PATENT DOCUMENTS 2843581 10/1978 Fed. Rep. of Germany .

*Primary Examiner*—James R. Hoffman
*Attorney, Agent, or Firm*—Herbert L. Lerner; Laurence A. Greenberg

[57] ABSTRACT

Method of producing electrical layer capacitors with glow-polymerizate layers as dielectrics, including a support surface, which includes initially forming a synthetic carrier strip having a substantially rectangular cross-section as well as given parts not to be coated with glow-polymerizate and a surface to be covered with glow-polymerizate, applying metal coating layers and glow-polymerizate layers offset from each other on the carrier strip forming contact strips on two mutually opposing edges of the carrier strip, the contact strips having within the extent thereof at least two metal layers lying directly on each other, and covering the given parts of the carrier strip not to be coated with at least one screen during the manufacture of the glow-polymerizate layers, wherein the improvement includes forming the recesses on areas of the carrier strip bordering the contact strips and not coated with glow-polymerizate, pressing the carrier strip against the support surface with holding devices contacting the carrier strip at the recesses before applying the glow-polymerizate layers, and then placing the screen on the surface of the carrier strip to be covered with glow-polymerizate at least during the glow-polymerization.

8 Claims, 2 Drawing Figures

METHOD OF PRODUCING ELECTRICAL LAYER CAPACITORS WITH GLOW-POLYMERIZATE LAYERS AS DIELECTRICS

The invention relates to a method of producing electrical layer capacitors with glow-polymerizate layers as dielectrics, wherein initially a carrier strip is formed of a synthetic or plastic material and has a substantially rectangular cross-section, metal layers of the coatings and glow-polymerizate layers are applied in a mutually offset manner so that at two opposing edges of the carrier strip contact strips are produced, the contact strips having, within their range, two or more metal layers directly superposed on each other, and wherein in the manufacture of the glow-polymerizable layers, the parts that are not to be coated are covered by screens.

Such a method is known from German Published, Non-Prosecuted Application DE-OS 28 43 581. It has been shown, however, that even within the smallest inter-layer gaps in the area of a glow discharge, a background-glow discharge takes place, i.e. glow-polymerizate layers are generated even in the smallest gaps when only at a very low intensity. These glow-polymerizate layers exhibit an interference effect in the contact strip area, inasmuch as further electrically conductive layers are applied to the glow-polymerizate layer for contacting purposes. Layers such as these include further coating surfaces to contact those lying below, or even solder layers for external contactings.

To avoid any background-glow discharges, a proposal from another source was made to use only a single screen and to apply it directly to the substrate strip when this measure is taken, however, it too is insufficient for the serial-production of capacitors such as these.

It is accordingly an object of the invention to provide a method of producing electrical layer capacitors with glow-polymerizate layers as dielectrics, which overcomes the hereinafore-mentioned disadvantages of the heretofore-known methods of this general type, and has a perfect contacting or bonding system without any interference produced by glow-polymerizate in the contact strip areas.

With the foregoing and other objects in view there is provided, in accordance with the invention, a method of producing electricallayer capacitors with glow-polymerizate layers as dielectrics, including a support surface, which includes initially forming a synthetic carrier strip having a substantially rectangular cross-section as well as given parts not to be coated with glow-polymerizate and a surface to be covered with glow-polymerizate, applying metal coating layers and glow-polymerizate layers off-set from each other on the carrier strip forming contact strips on two mutually opposing edges of the carrier strip, the contact strips having within the extent thereof at least two metal layers lying directly on each other, and covering the given parts of the carrier strip not to be coated with at least one screen during the manufacture of the glow-polymerizate layers, wherein the improvement comprises forming recesses on areas of the carrier strip bordering the contact strips and not coated with glow-polymerizate, pressing the carrier strip against the support surface with holding devices contacting the carrier strip at the receses before applying the glow-polymerizate layers, and then placing the screen on the surface of the carrier strip to be covered with glow-polymerizate at least during the glow polymerization.

The invention makes it feasible to use diaphragms or screens having a reduced wall thickness, which is required for a clean definition of glow-polymerizate film layers. By using the method according to the invention, the carrier strip can be clamped over its entire length, regardless of the position of the screen or of the capacitively effective layers, because the retaining means can be provided with such a miniaturization, that they fall short of reaching the level of the carrier surface to be coated. Coating diaphragms or masks can therefore be applied without taking these retainer means into account.

For advantageous results in accordance with another mode of the invention, there is provided a method which comprises forming the recesses in the shape of longitudinal slots or grooves. In this way the carrier strip can be pressed against the support surface at any given point.

In accordance with a further mode of the invention, there is provided a method which comprises forming the recesses in the shape of grooves. Thus, in a simple manner, a bonding of the coating surfaces is accomplished.

In accordance with an added mode of the invention, there is provided a method which comprises engaging the carrier strip at the recesses into a snap-in device pressing the carrier strip against the support surface. Snap-in devices which are usable include metal springs or plastic noses in spring-loaded conjunction with the support plate.

In accordance with an additional mode of the invention, there is provided a method which comprises forming the carrier strip by compression molding.

In accordance with again another mode of the invention, there is provided a method which comprises forming the carrier strip of polyphenylene sulphide. This results in a high electrical and mechanical component stability. At most, and especially under conditions of fluctuating temperature, extremely minor mechanical stresses are set up, specifically in the capacitively effective layers.

In accordance with a concomitant mode of the invention, there is provided a method which comprises placing a given side of the carrier strip on the support surface, and forming a grooved texture on the given side of the carrier strip. In this way, even upon pasting components onto an adhesive coated circuit board, any warping and consequent mechanical stress set up in the capacitors is avoided, because any excess adhesive is pushed into the grooves instead of causing a bulging or curvature of the component because of pressures extending over the entire surface of the component.

Following the coating of the carrier strip, it is cut up into capacitors of any desired length, e.g., by means of a metal-slitting saw. The simultaneously produced effect is that of an edge insulation of coating surfaces along the cut edge as is customary with layer capacitors. Furthermore, other separating methods, e.g., cutting up the carrier strip within metal-free strips, is possible.

Other features which are considered as characteristic for the invention are set forth in the appended claims.

Although the invention is illustrated and described herein as embodied in method of producing electrical layer capacitors with glow-polymerizate layers as dielectrics, it is nevertheless not intended to be limited to the details shown, since various modifications may be made therein without departing from the spirit of the invention and within the scope and range of equivalents of the claims.

Figure 2:
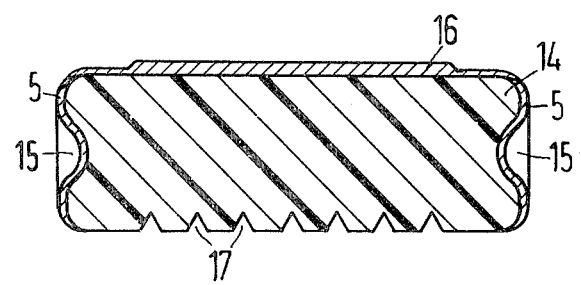

The invention, however, together with additional objects and advantages thereof will be best understood from the following description when read in connection with the accompanying drawing, in which:

FIG. 1 is a diagrammatic, cross-sectional view of a capacitor strip according to the invention, which is held in a snap-in device; and FIG. 2 is a diagrammatic cross-sectional view of a second embodiment of a coated substrate or carrier strip according to the invention.

Referring now to the figures of the drawing and first particularly to FIG. 1 thereof, it is seen that two clamping springs 2 are attached onto a support plate 1, the springs forming a snap-in device. A carrier strip 3 is pressed against the support plate 1 by means of these springs 2. To this effect, the clamping springs 2 engage longitudinal grooves 4 at two opposing sides of the carrier strip. The longitudinal grooves 4 extend over the entire length of the carrier strip. The longitudinal grooves 4 are produced during the fabrication of the carrier strip, e.g., by compression molding or extrusion of the carrier strip. Metal layers 5 which are applied to the surfaces of the carrier strip provided with the grooves 4, reach around the rounded-off edges thereof. Coating surfaces 7, 8, respectively, overlap edges 9, 10, respectively, of respective metal layers 5, with contact strips 18, 19 thereof. A glow-polymerizate layer 11 is disposed between each of the coating surfaces 7 and 8. Two strip-like diaphragms or shields 12 limit the width of the next glow-polymerizate layer to be applied. The diaphragms 12 are applied to the layers lying below. The screens or diaphragms 12 can be applied throughout their entire length to the layers lying below, because the carrier strip has a planar surface without any curvature or other warpings, based on the compression against the support plate according to the invention.

A further embodiment is that of a carrier strip 14 shown in FIG. 2. The carrier strip 14 contains trough-like recesses 15 on two opposite sides thereof. In this case too, the sides are covered by contact strips 5. The capacitance itself is formed by a sequence 16 of coating and glow-polymerizate layers. Furrows or grooves 17 are placed on the side of the carrier strip opposite the layer sequence 16. The grooves 17 provide that upon pasting the completed capacitor on an adhesive coated circuit board, the adhesive flows into the grooves 17 and any curvature of the carrier 14 is avoided. In this way, any mechanical stress points are avoided even at the stage of assembling the capacitor. This is of advantage particularly for relatively large capacitor surfaces.

There are claimed:

1. Method of producing electrical layer capacitors with glow-polymerizate layers as dielectrics, including a support surface, which includes initially forming a synthetic carrier strip having a substantially rectangular cross-section as well as given parts not to be coated with glow-polymerizate and a surface to be covered with glow-polymerizate, applying metal coating layers and glow-polymerizate layers offset from each other on the carrier strip forming contact strips on two mutually opposing edges of the carrier strip, the contact strips having within the extent thereof at least two metal layers lying directly on each other, and covering the given parts of the carrier strip not to be coated with at least one screen during the manufacture of the glow-polymerizate layers, wherein the improvement comprises forming recesses on areas of the carrier strip bordering the contact strips and not coated with glow-polymerizate, pressing the carrier strip against the support surface with holding devices contacting the carrier strip at the recesses before applying the glow-polymerizate layers, and then placing the screen on the surface of the carrier strip to be covered with glow-polymerizate at least during the glow-polymerization.

2. Method according to claim 1, which comprises forming the recesses in the shape of longitudinal slots.

3. Method according to claim 1, which comprises forming the recesses in the shape of grooves.

4. Method according to claim 1, which comprises forming the recesses in given sides of the carrier strip and leaving another side free, applying contact layers to the given sides of the carrier strip having the recesses formed therein, and applying the coating layers to the free side of the carrier strip overlapping edges of the contact layers.

5. Method according to claim 1, which comprises engaging the carrier strip at the recesses into a snap-in device pressing the carrier strip against the support surface.

6. Method according to claim 1, which comprises forming the carrier strip by compression molding.

7. Method according to claim 1, which comprises forming the carrier strip of polyphenylene sulfide.

8. Method according to claim 1, which comprieses placing a given side of the carrier strip on the support surface, and forming a grooved texture on the given side of the carrier strip.

* * * * *